United States Patent [19]

Kim

[11] Patent Number: 5,377,173
[45] Date of Patent: Dec. 27, 1994

[54] JOG METHOD FOR OPTICAL DISK PLAYERS HAVING A CONSTANT LINEAR VELOCITY

[75] Inventor: Young-yon Kim, Kyungki-do, Rep. of Korea

[73] Assignee: Samsung Electronics Co., Ltd., Kyungki-do, Rep. of Korea

[21] Appl. No.: 10,190

[22] Filed: Jan. 28, 1993

[30] Foreign Application Priority Data

Jan. 28, 1992 [KR] Rep. of Korea ............... 92-1227

[51] Int. Cl.$^5$ ............................................. G11B 7/00
[52] U.S. Cl. ...................................... 369/32; 358/342
[58] Field of Search ........................... 369/32, 33, 124; 360/10.1, 10.2, 10.3, 11.1; 358/335, 342

[56] References Cited

U.S. PATENT DOCUMENTS

| | | | |
|---|---|---|---|
| 4,866,542 | 9/1989 | Shimada et al. | 300/10.3 |
| 5,132,946 | 7/1992 | Tanaka | 369/32 |
| 5,179,480 | 1/1993 | Takahashi | 360/10.1 |
| 5,187,630 | 2/1993 | MacKay et al. | 360/10.3 |

Primary Examiner—Benny Lee
Assistant Examiner—Tan Dinh
Attorney, Agent, or Firm—Sughrue, Mion, Zinn, Macpeak & Seas

[57] ABSTRACT

A jog method for viewing video signals frame-by-frame during a reproducing stage in an optical disk player using an optical disk which rotates at a constant linear velocity as a video recording medium involves steps for providing jog mode data to a microcomputer via a key input, generating a jog play control signal to perform a jog play, reproducing signals of one track on a disk via a pickup by the control signal, and displaying a video signal of one field to display a video signal of only one frame if a vertical sync signal or picture number data of a first odd-numbered field video signal exists among video data input to a microcomputer, and shifting the pickup by one track to the next track on the disk to reproduce signals of the next track. Accordingly, the jog function can be realized without using a high-priced memory.

6 Claims, 2 Drawing Sheets

JOG METHOD FOR OPTICAL DISK PLAYERS HAVING A CONSTANT LINEAR VELOCITY

BACKGROUND OF THE INVENTION

1. Field of the Invention

The present invention relates to a jog method for an optical disk player, for example, a laser disk player which uses an optical disc which rotates in a constant linear velocity as a video recording medium, and more particularly, relates to a jog method for an optical disk player so that video signals can be viewed frame-by-frame or in a slightly faster sequence during a reproducing stage.

2. Brief Description of the Related Art

Generally, a laser disk player is an electronic apparatus which records a digital signal on a disk, and thereafter, projects light having a high concentration capability such as a laser beam onto the surface of the disk and receives the reflected light, thereby reproducing the signal according to the variation of the quantity of light as the disk rotates. Here, the disk rotating methods for recording and reproducing video signals in laser disk players are classified into two types: constant angular velocity rotation and constant linear velocity rotation.

In the method for rotating the optical disk at a constant angular velocity, the number of disk revolutions per minute when the pickup for reproducing recorded video signals is located at the outermost circumference of the disk is the same as that when the pickup is located at its innermost circumference. Conventionally, the disk rotates at 1,800 revolutions per minute (rpm), by which one frame of video signals is recorded on one track of the disk according to a signal recording format of the disk. In this method, since the rotation velocities of the outer circumference and the inner circumference are constant, when performing a search jog by which images can be viewed frame-by-frame in sequence or in a slightly faster sequence, one picture can be normally reproduced with either track (outer or inner) being searched. Also, when performing a still jog for displaying one image continuously, if a track is continuously reproduced, a corresponding image is displayed as a still image.

However, in case of the method for rotating the disk at a constant angular velocity, as reproducing one side of an optical disk takes 30 minutes, accordingly it takes 60 minutes to reproduce both sides of the optical disk. Here, since only one image is recorded on a single track irrespective of the tracks of the inner and the outer circumferences during the recording of data, the recording capacity cannot be increased.

Thus, to solve the above problem, a method has been proposed to record a large amount of information on a disk, wherein signals are recorded in an equal density on the outer and the inner circumference of the optical disk, and then the recorded signals are reproduced by rotating the disk at a constant linear velocity. With the disk thus rotating, the number of revolutions per minute of the disk when the pickup is located at the outermost circumference of the disk is different from that when the pickup is located at the innermost circumference thereof. Conventionally, the disk rotates at 1,800 rpm at the innermost circumference while it rotates at 600 rpm at the outermost circumference. Thus, since the revolutions per minute at the outermost circumference is a third that at the innermost circumference, it is possible to record three-times the video signals at the outermost circumference than at the innermost circumference, in view of the recording and reproducing time. In other words, in the optical disk which rotates at a constant linear velocity, the video signals of three frames are recorded on a single track within the outermost circumference, while the video signals of one frame are recorded on one track of the innermost circumference.

To summarize the above explanation, in case of the rotation of the disk at a constant angular velocity, since the rotation velocity of the disk's outermost circumference equals that of the innermost circumference, this method facilitates the use of such functions as a search jog by which images can be viewed frame-by-frame in sequence or in a slightly faster sequence, and a still jog by which one image is continuously viewed. However, in the disk in which the rotation velocities of the outermost and the innermost circumferences are different from each other, and the video signals of three frames are recorded on a single track within the outermost circumference, while the video signals of one frame are recorded on the track of the innermost circumference, such a rotation method makes it impossible to perform the above-described functions of search jog and still jog.

That is, in the constant angular velocity mode, only one frame is recorded per track, thus, performing the jog operation is easy since all that needs to be done is to continuously reproduce the signals recorded on the track. If the pick-up is not moved from that one track, there is no way anything other than that single frame can be reproduced. On the other hand, in the constant linear velocity mode, there may be up to three frames recorded on a track, thus, it is not so easy to reproduce only a single frame. For the constant linear velocity mode, if the pick-up is merely left on one track and nothing more is done, more than one frame will be reproduced (for any track other than the innermost track) and thus the jog operation will be unsuccessful.

To enable these functions when rotating at a constant linear velocity, expensive digital memories must be used, to convert analog video signals of one frame into digital video signals, so that the digital signal can be processed by a microcomputer and converted back into the analog signal for outputting single frames or individual multiple frames.

SUMMARY OF THE INVENTION

Therefore, it is an object of the present invention to provide a jog method for performing functions of a search jog and a still jog without using an expensive digital memory in a disk which rotates at a constant linear velocity.

To accomplish the above-mentioned object of the present invention, there is provided a jog method for use in an optical disk player in which an optical disk rotates at a constant linear velocity and the recorded signal is reproduced by processing of a signal using pickup means, the jog method comprising the steps of:

inputting jog mode data to a microcomputer via key input means;

generating a jog play control signal to perform a jog play after the jog mode data is input;

reproducing signals of one track on a disk via the pickup means in response to control signal, and displaying a video signal of one field to display a video signal of one frame only if a vertical sync signal or picture number data of a first odd-numbered field video signal exists among video data input to a microcomputer; and after accomplishing reproduction of signals of one track on the disk via the pickup means, shifting the pickup means by one track to the next track on the disk to reproduce signals of the next track.

The jog operation processes the video signals to be viewed frame-by frame or in a slightly faster sequence during a reproducing stage, so that, during jog operation, the signal processing of the signal processing unit must be achieved per one frame which is comprised of odd- and even-numbered fields. Therefore, the vertical sync signal or the picture number of the odd-numbered field must be checked in order to distinguish the frames among the reproduced signals.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE PREFERRED EMBODIMENT

A preferred embodiment of the present invention will be described below in detail with reference to the accompanying drawings.

Figure 1:
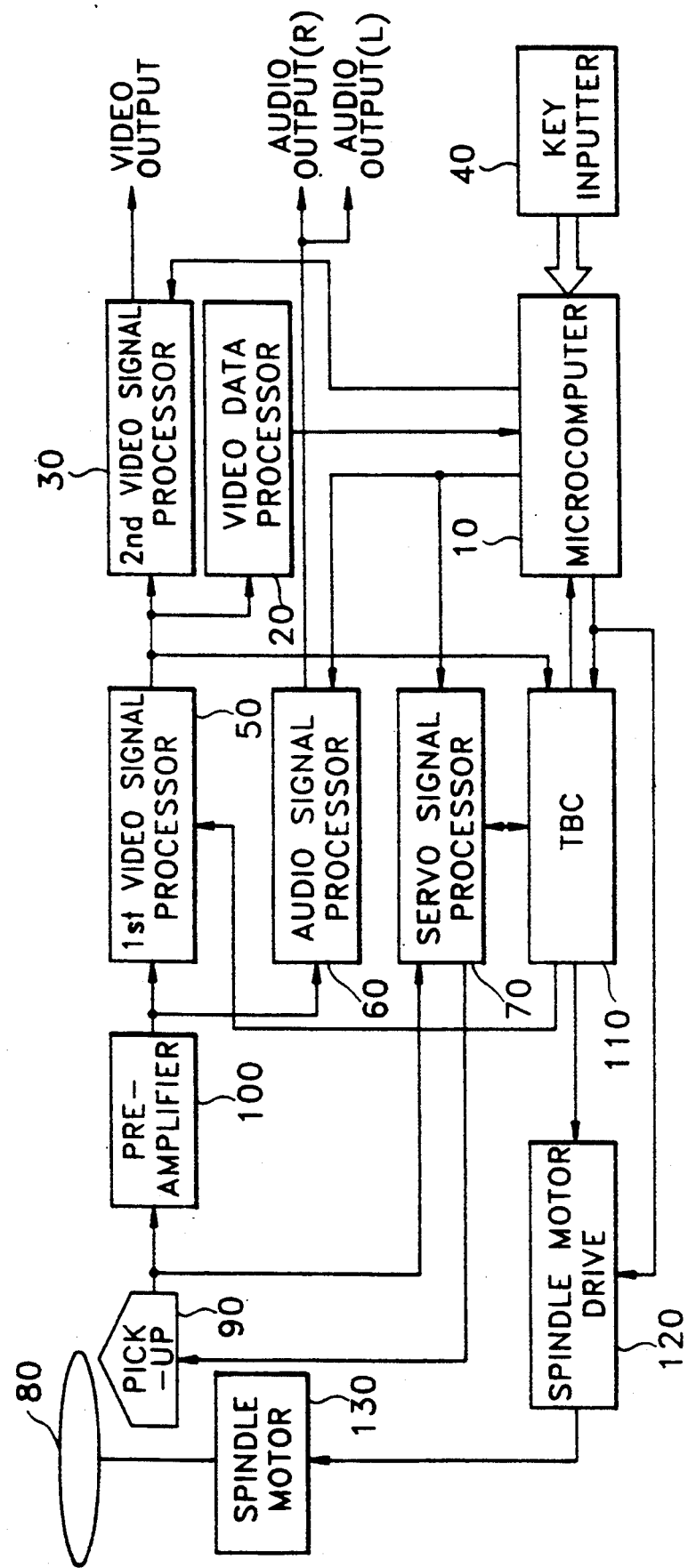
FIG. 1 is a block diagram of an optical disk player having a constant linear velocity to which a jog method according to the present invention is applied.

Referring to FIG. 1, an optical disk player to which the present invention is applied comprises a pickup 90 connected with both an optical disk 80 on which digital video data signals are recorded and a spindle motor 130, and the pickup projects a laser beam onto the surface of the optical disk and receives the reflected light. The output of pickup 90 is connected to a pre-amplifier 100 for amplifying the picked-up signal and a servo signal processor 70 for correcting error signals from the picked-up signal and servo-controlling the pickup. The output of pre-amplifier 100 is connected to a first video signal processor 50 for processing video signals and an audio signal processor 60 for processing audio signals.

The output of first video signal processor 50 is connected to a second video signal processor 30 for processing and outputting video signals, to a video data processor 20 for processing video data among the video signals, and to a time-base corrector 110 for correcting the time base between the video signal and a servo control signal. Here, second video signal processor 30 outputs the video signals, the output of video data processor 20 is connected to a microcomputer 10, and audio signal processor 60 outputs the audio signals.

The outputs of servo signal processor 70 are connected to time-base corrector 110 and pickup 90. The outputs of time-base corrector 110 are connected to a spindle motor driver 120, microcomputer 10 and servo signal processor 70. A key input 40 for inputting key data is connected to microcomputer 10. The outputs of microcomputer 10 are connected to audio signal processor 60, servo signal processor 70, time-base corrector 110, spindle motor driver 120 and second video signal processor 30, respectively. The output of spindle motor driver 120 is connected to spindle motor 130.

Figure 2:
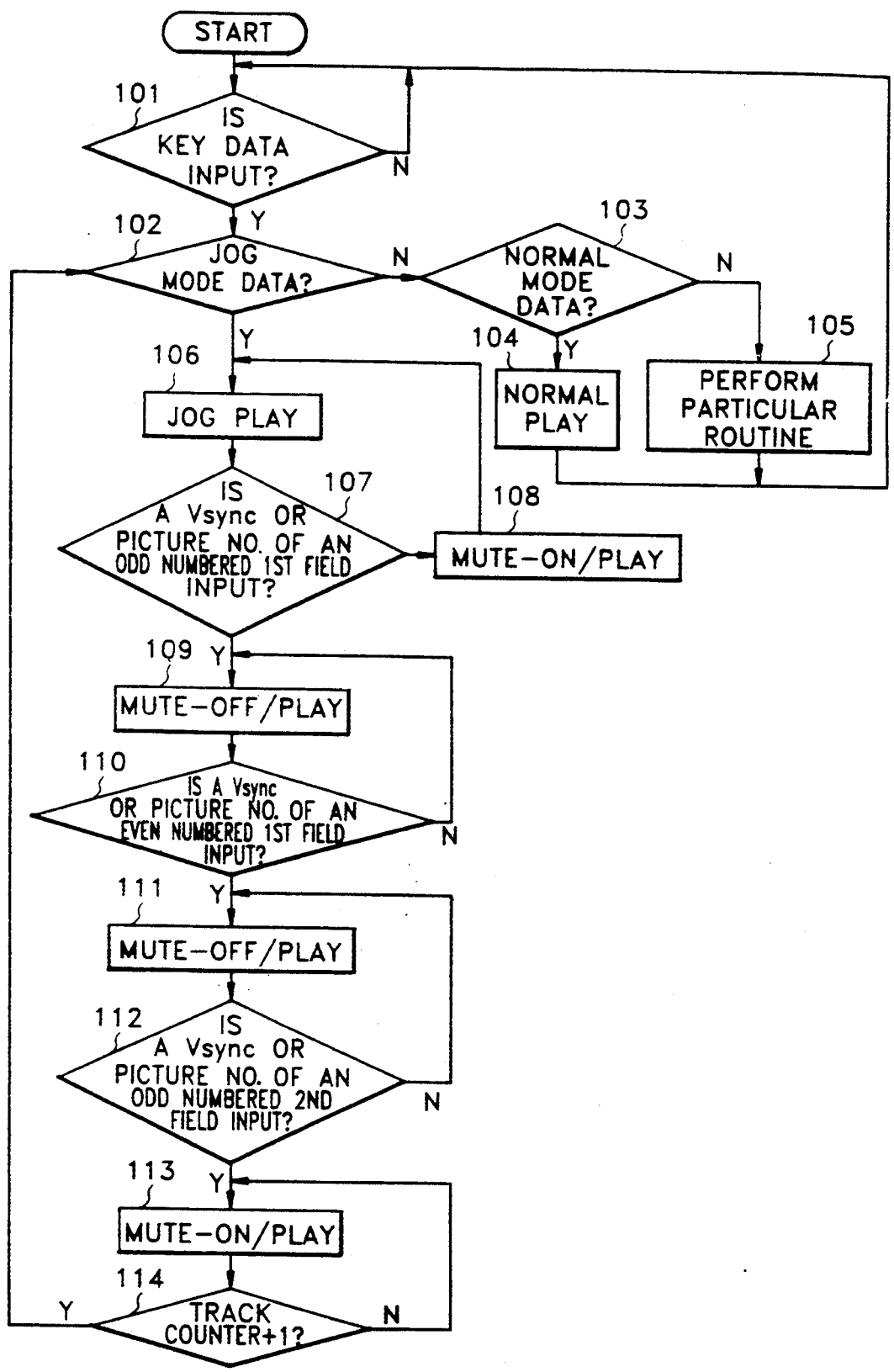
FIG. 2 is a flowchart for explaining a jog operation of one embodiment of an optical disk player having a constant linear velocity according to the present invention.

FIG. 2 is a flowchart for explaining a jog operation of one embodiment of an optical disk player having a constant linear velocity according to the present invention. Here, steps 101 and 102 represent a procedure of inputting jog mode data, steps 103 through 105 represent a procedure of performing a normal play mode, step 106 represents a procedure of performing a jog, steps 107 through 113 represent a procedure of displaying one frame of a video signal, and step 114 represents a procedure of shifting one track.

Operations of the jog method according to the present invention will be described below with reference to FIGS. 1 and 2.

In step 101, microcomputer 10 checks by a predetermined period whether or not key data is input through key input 40 such as a key matrix mounted on a remote controller or a player. In step 102, if the key data input through key input 40 in step 101 is input to microcomputer 10, it judges whether or not the key data is jog mode data. If the key data input through key input 40 in step 102 is not jog mode data, microcomputer 10 judges whether or not the key data is normal reproduction mode data in step 103. Then, if the key data input through key input 40 in step 103 is not normal reproduction mode data, microcomputer performs a particular routine corresponding to the key data in step 105. On the other hand, if the key data is normal reproduction mode data in step 103, microcomputer 10 outputs a normal play mode control signal through an output terminal thereof, to perform a normal reproduction of the laser disk player in step 104.

The operation in step 104 will be described in detail referring to FIG. 1 as follows.

If microcomputer 10 supplies control signals to time-base corrector 110 and spindle motor driver 120, spindle motor 130 rotates according to the output of the spindle motor driver, and thus optical disk 140 rotates according to the rotation of spindle motor 130. Here, spindle motor 130 rotates in a constant linear velocity according to the location of the pickup on the optical disk. That is, the disk rotates at 600 rpm when pickup 90 is located on the outermost circumference of optical disk 80, and at 1,800 rpm when on the innermost circumference.

Concurrent with the rotation of optical disk 80, pickup 90 projects the laser beam onto the surface of optical disk 80, and then receives the reflected light, thereby reading data on the surface of the optical disk. Since the signal read through pickup 90 is weak, the read signal is input to pre-amplifier 100 to be amplified, and to servo signal processor 70 for controlling various means according to a control signal supplied from microcomputer 10. The signal amplified in pre-amplifier 100 is supplied to first video signal processor 50 controlled by the output signal of time-base corrector 110 for processing the video signals, and to audio signal processor 60 controlled by an output signal of microcomputer 10 for processing the audio signals.

The output of first video signal processor 50 is supplied to time-base corrector 110 for correcting the time-base of the video signal and the servo control signal, to second video signal processor 30 controlled by the output signal of microcomputer 10 for processing and outputting the video signals, and to video data processor 20 for processing video data from the video signals output from first video signal processor 50 and then supplying the processed video data to microcomputer 10. Here, the output of video data processor 20 is input to microcomputer 10 for outputting a control signal based on the video signals, responsive to which second video signal processor 30 outputs the video signals, and audio signal processor 60 outputs the audio signals.

In step 106, if the key data input through key input 40 in step 102 is jog mode data, microcomputer 10 outputs a jog play control signal through an output terminal thereof, to perform a jog reproduction of the laser disk player. The operation of step 106 will be described in detail referring to FIG. 1 as follows.

When microcomputer 10 supplies control signals to time-base corrector 110 and spindle motor driver 120, spindle motor 130 rotates according to the output of the spindle motor driver. Here, spindle motor 130 rotates at a constant linear velocity in which the rotation velocity is dependent upon the location of pickup 90 on disk 80, such that one frame of a video signal is recorded on one track of the innermost circumference of the optical disk which is rotating at a constant linear velocity. In the jog mode state, the signals of one track are read out through pickup 90, and only one frame of the video signal is reproduced.

After executing step 106, microcomputer 10 reads the signals of one track on the disk, and judges in step 107 whether or not a vertical sync signal or picture number of the first odd-numbered field (i.e., the first field among two fields constituting one frame) among the video data processed and output from video data processor 20 through pre-amplifier 100 and first video processor 50, is input thereto. Then, if the vertical sync signal or the picture number of the first odd-numbered field is not input to microcomputer 10, the audio and video signals are muted and one track of the disk is continuously reproduced in step 108, to continuously perform the jog. In this case, the input signal is not reproduced at the start position of the track. Therefore, the audio and video signals are muted while the remaining part of the corresponding track is reproduced. The operation of step 108 will be described in detail referring to FIG. 1 as follows.

If, among the video signals of one field (lines 0 to 262.5) input to microcomputer 10 through video data processor 20 by reproducing the signals of the track on optical disk 80, the picture number (field number) data located on the sixteenth line of the first odd-numbered field or the vertical sync signal of the odd-numbered field (existing in every field) is not input to microcomputer 10, the microcomputer supplies the mute-on signal to audio signal processor 60 and second video signal processor 30, thereby preventing the audio signals and the video signals from being output. To perform the jog continuously, microcomputer 10 instructs pickup 90 to reproduce the signals of a track on the disk through servo signal processor 70.

In step 109, if microcomputer 10 receives the vertical sync signal or the picture number of the first odd-numbered field among the video data output from video data processor 20 in step 107, the mute-off signal is supplied to second video signal processor 30 and audio signal processor 60, thereby reproducing the video signals of one field. To perform the jog continuously, the signals of a track on the disk are continuously reproduced. In this case, the signal reproduced at the start position of the track is input. Therefore, the muting of the audio and video signals is released. The operation of step 109 will be described in detail referring to FIG. 1 as follows.

If, among the video signals of one field (lines 0 to 262.5) input to microcomputer 10 through video data processor 20 by reproducing the signals of the track on optical disk 80, the picture number data located on the sixteenth line of the odd-numbered field or the vertical sync signal of the first odd-numbered field (existing in every field) is input to microcomputer 10, the microcomputer supplies a mute-off signal to audio signal processor 60 and second video signal processor 30, thereby outputting one field of the video signal.

After executing step 109, microcomputer 10 judges whether or not the vertical sync signal or the picture number of the first even-numbered field among the video data output from video data processor 20 is input thereto in step 110. If YES, microcomputer 10 mutes the audio and video signals, thereby first displaying one field of the video signal so that one frame can be ultimately displayed. To continuously perform the jog, the signals of one track on the disk are continuously reproduced in step 111. If the decision in step 110 is NO, step 109 is continuously executed.

After executing steps 110 and 111, microcomputer 10 judges whether or not the vertical sync signal or the picture number of the second odd-numbered field among the video data output from video data processor 20 is input thereto in step 112.

If the video data input from video data processor 20 is not the vertical sync signal or the picture number of the second odd-numbered field in step 112, microcomputer 10 repeatedly executes the operation of step 111. On the other hand, if the vertical sync signal or the picture number is input to microcomputer 10, the mute-on signal is supplied to second video signal processor 30 and audio signal processor 60, thereby preventing the video and audio signals from being output. To continuously perform the jog, the signals of one track on the disk are continuously reproduced in step 113.

After executing step 113, microcomputer 10 judges whether or not pickup 90 has reproduced all the signals of one track on the disk in step 114. If pickup 90 does not reproduce all the signals of one track on the disk in step 114, step 113 is continuously executed. On the other hand, if pickup 90 has reproduced all the signals of one track on the disk, microcomputer 10 instructs pickup 90 to shift to the next track, to then follow steps 102 through 113.

As described above, the present invention enables the functioning of a still jog by which one picture can be continuously viewed in a laser disk player having a constant linear velocity or a search jog by which the pictures are viewed frame-by-frame or in a slightly faster sequence, without using a high-priced digital memory.

What is claimed is:

1. A jog method for use in an optical disk player in which an optical disk rotates at a constant linear velocity and the recorded signal is reproduced by a signal process using a pickup head, said jog method comprising the steps of:
   (a) inputting jog mode data to a microcomputer via key input device;
   (b) generating a jog play control signal to perform a jog play after the jog mode data is input;
   (c) reproducing signals from one track on said optical disk via said pickup head in response to the control signal, and displaying a video signal of one field to display a video signal of only one frame if a vertical sync signal or picture number data of a first odd-numbered field video signal exists among video data input to said microcomputer; and (d) shifting said pickup means by one track to the next track on the disk to reproduce signals of the next track after accomplishing reproduction of signals of one track on the disk via said pickup means.

2. The jog method according to claim 1, wherein said step (c) comprises the steps of:

(e) reproducing the signals read using said pick-up head of one track on the optical disk and displaying video signals of a first odd-numbered field if one of said vertical sync signal or picture number data of said first odd-numbered field video signal exists among said video data input to said microcomputer;

(f) displaying video signals of a first even-numbered field if one of another vertical sync signal and picture number data of a first even-numbered field video signal exists among video data input to said microcomputer, after performing said step (e); and (g) muting a portion of said video signals of corresponding to a second frame on the one track if said vertical sync signal or said picture number data indicative of a second odd-numbered field video signal exists among said video data input to said microcomputer, after performing said step (f).

3. A method of reproducing video signals recorded on an optical disk on a frame-by-frame basis, wherein said disk rotates with a constant linear velocity and wherein more than one frame is recorded on some tracks of said disk, comprising the steps of:

reproducing said video signals from one track of said optical disk;

checking to see whether the reproduced video signals correspond to signals recorded at the beginning of said track; and muting the reproduced video signals if the reproduced video signals do not correspond to said signals recorded at the beginning of said track.

4. A method of operation for providing a jog function for use in an optical disk player wherein the recorded signal is reproduced by a signal processor using a pickup head and wherein a constant linear velocity optical disk contains, on average, a video signal representing in excess of one frame image, said method comprising the steps of:

(a) reproducing the video signal from one track of said optical disk so as to provide a reproduced video signal;

(b) extracting first and second indicia of first and second video fields, respectively, corresponding to said frame image;

(c) generating a control signal permitting further reproduction of said first and second fields when said first and second indicia are present and permitting muting of images corresponding to said reproduced signal in the absence of said first and second indicia.

5. The method according to claim 4, wherein said first and second indicia are each vertical sync signals.

6. The method according to claim 4, wherein said first and second indicia are each picture number data.

* * * * *